United States Patent [19]

Zirngiebl et al.

[11] 3,970,528
[45] July 20, 1976

[54] PROCESS FOR THE PURIFICATION OF ELECTROLYSIS BRINE

[75] Inventors: Eberhard Zirngiebl, Cologne; Alfred Irlenkäuser, Leverkusen, both of Germany

[73] Assignee: Bayer Aktiengesellschaft, Leverkusen, Germany

[22] Filed: Oct. 20, 1975

[21] Appl. No.: 624,213

[30] Foreign Application Priority Data

Oct. 23, 1974 Germany............................ 2450259

[52] U.S. Cl............................... 204/98; 204/128; 423/159; 423/165; 423/193
[51] Int. Cl.² ...................... C25B 1/16; C25B 1/26; C01F 5/22
[58] Field of Search .............. 204/128, 98; 423/193, 423/159, 165, 158

[56] References Cited
UNITED STATES PATENTS 3,745,101    7/1973    Currey et al.......................... 204/98

Primary Examiner—R. L. Andrews
Attorney, Agent, or Firm—Burgess, Dinklage & Sprung

[57] ABSTRACT

Brine is purified prior to electrolysis by dividing it into two streams, removing sulfate from one of the streams by precipitation with calcium chloride to form calcium sulfate, removing the precipitate and re-combining the streams. Alkali hydroxide plus sodium carbonate are added to the re-combined streams to precipitate calcium carbonate which is removed. Any magnesium comes down as the hydroxide. The brine is then pure enough for electrolysis The calcium sulfate first precipitate is reacted with sodium hydroxide and carbon dioxide to form calcium carbonate which is then reacted with hydrochloric acid to form calcium chloride which is recycled to the process for precipitating calcium sulfate.

7 Claims, 1 Drawing Figure

U.S. Patent  July 20, 1976  3,970,528
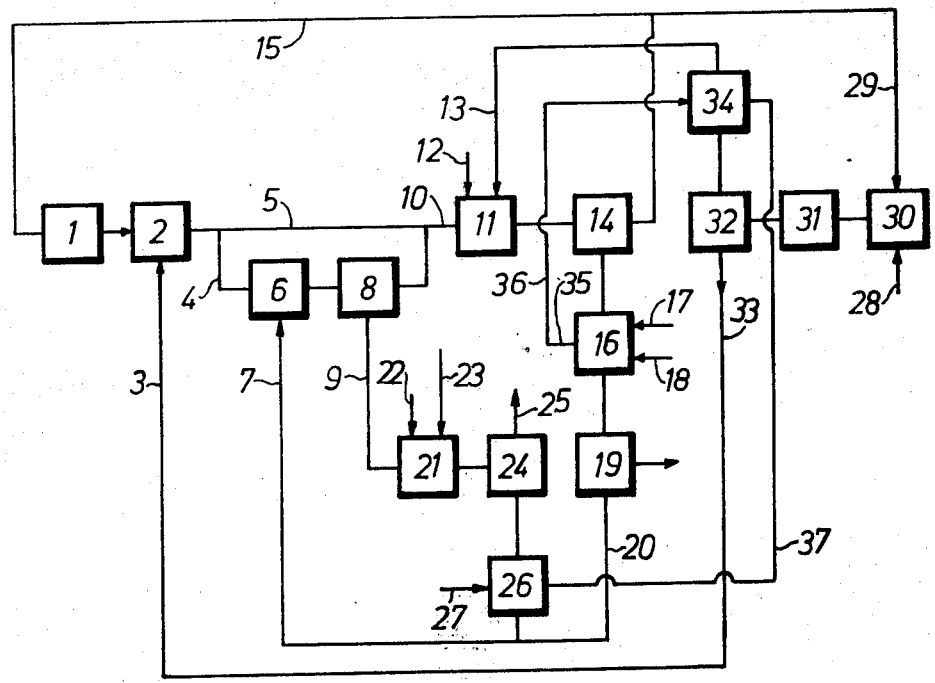

PROCESS FOR THE PURIFICATION OF ELECTROLYSIS BRINE

The brines used for the electrolysis of alkali metal chlorides by the Amalgam process have to be freed from troublesome constituents, for example $SO_4^{2-}$-, $Ca^{++}$-, $Mg^{++}$-ions. In known processes, $SO_4^{2-}$ is precipitated with $Ba^{++}$; $Ca^{++}$ is precipitated with $CO_3^{2-}$; and $Mg^{++}$ is precipitated with $OH^-$. The precipitation mixture generally consists of barium carbonate, soda and sodium hydroxide. Of these three components, barium carbonate is the most expensive. For this reason, attempts have already been made to precipitate the $SO_4^{2-}$ with $Ca^{++}$. In this known process, some of the sulfate is precipitated in the form of $CaSO_4 . 2 H_2O$ in the brine by the addition of $CaCl_2$ or $Ca(OH)_2$, and then separated off. The brine thus treated, which has a calcium content of at least 0.5 g/l, is introduced into the electrolysis cell. However, the presence of such large quantities of $Ca^{++}$ in the electrolysis cell is a considerable disadvantage.

In another known process (described in Brine Purification For The Mercury Cell Process, Paper presented at the Cleveland Meeting of Electrochemical Society, May 1966), the sulfate content of the brine is controlled through the precipitation of $CaSO_4 . 2 H_2O$. To this end, substantially half the sulfate is precipitated with an excess of $Ca^{++}$-ions in a component stream of the brine, generally amounting to about 1/10 of the total quantity of brine, the $CaSO_4 . 2 H_2O$ deposit formed is separated off in the component stream and finally the component stream freed from the sulfate is recombined with the main brine stream. Since approximately 1.1 to 4 moles of $Ca^{++}$, based on sulfate in the component stream, are used during precipitation of the sulfate in the component stream, depending upon the sulfate content, the excess calcium, which would be troublesome during electrolysis, is precipitated in the form of $CaCO_3$ after the component streams have been combined by the addition of sodium carbonate to which up to 5% by weight of NaOH may be added. Precipitation is carried out in such a way that, after precipitation, the concentration of $CO_3^{--}$ in the solution does not exceed 1 g/l, while the pH-value does not exceed pH 11. In addition to $Ca^{++}$, which emanates from the $CaSO_4 . 2 H_2O$ precipitation step, $Mg^{++}$, which may be present as an impurity in the brine, is co-precipitated during this precipitation. Following this second precipitation, the brine thus treated is filtered, $Mg(OH)_2$- containing $CaCO_3$ being removed from the circuit as residue. The purified brine, in which required sulfate ion concentrations can be adjusted in this way (these concentrations are generally of the order of 5 g/l to 20 g/l), may then be introduced into the electrolysis cell.

Although it is possible with this known process also to reduce the $Ca^{++}$-concentration to such an extent that $Ca^{++}$ no longer occurs as a troublesome factor in the electrolysis cell, this process involves the use of considerable quantities of calcium chloride as precipitant in the $SO_4$-precipitation stage and of soda in the main precipitation stage. Both precipitants are lost in the form of $Mg(OH)_2$-containing calcium carbonate.

The present invention provides a process for purifying electrolysis brine by dividing the electrolysis brine into component streams, precipitating sulfate substantially quantitatively in the form of $CaSO_4 . 2 H_2O$ in a first precipitation step by adding calcium chloride to one of the component streams, separating off the deposit, combining the component stream freed from the deposit with the other component stream, precipitating the calcium excess and any magnesium present substantially quantititatively by the addition of sodium carbonate and alkali hydroxide, separating off the $CaCO_3$- deposit optionally containing $Mg(OH)_2$ from the brine and introducing the purified brine into the electrolysis cell, wherein $CaSO_4 . 2 H_2O$ separated off after the first precipitation stage is converted under pressure with sodium hydroxide and $CO_2$ into $CaCO_3$ and $Na_2SO_4 . 10 H_2O$, $Na_2SO_4 . 10 H_2O$ is separated off, $CaCO_3$ is converted with hydrochloric acid into $CaCl_2$ and $CO_2$, optionally with addition of the $CaCO_3$ obtained in the second precipitation stage and separated off, and the resulting acid $CaCl_2$-containing solution is recycled for the precipitation of $SO_4$-ions.

The individual stages of the process according to the invention are described in more detail in the following. First of all, part of the impure brine, depending upon the $SO_4$-concentration, for example about 1/10 for a concentration of 8 g/l, is branched off and $SO_4$ precipitated by the addition of calcium chloride solution in a quantity corresponding to the sulfate freshly introduced through the addition of make-up sodium chloride for regenerating the brine weakened in concentration during electrolysis. The calcium sulfate dihydrate precipitated is separated off from the brine, for example in a settling vessel or in a filtration unit. The brine freed from the deposit is then reintroduced into the main stream. The residual $SO_4^{--}$-concentration in the component stream treated with $Ca^{++}$-ions is adjusted with an excess of $Ca^{++}$ corresponding to the solubility product for $CaSO_4 . 2 H_2O$. This amounts to about 1.1 to 4 and preferably about 1.5 to 2.5 moles, based on the $SO_4$ to be precipitated in the component stream. The entire quantity of brine, including the component stream substantially freed from $SO_4$, is then treated with soda and sodium hydroxide, the calcium introduced during regeneration of the brine weakened in concentration during electrolysis and the excess of calcium, which was added in the form of calcium chloride for precipitating the sulfate, being precipitated in the form of $CaCO_3$, while the $Mg^{++}$ present is precipitated in the form of $Mg(OH)_2$. In this precipitation stage, soda or sodium hydroxide is added in such quantities that, on completion of precipitation, the solution is left with an excess of $CO_3^{--}$ of up to about 1 g/l, preferably about 0.2 to 0.5 g/l of carbonate, and with a pH-value of no higher than about 11. The brine containing the deposit is introduced for example into a filtration unit in order to separate the deposit and is then introduced into the electrolysis cell, optionally after pH-adjustment to between pH 4 and pH 8 by the addition of hydrochloric acid.

The filter residue, which essentially contains calcium carbonate and magnesium hydroxide, is reacted substantially stoichiometrically with hydrochloric acid at temperatures in the range from about 25°C to 80°C to form $CaCl_2$, $MgCl_2$ and gaseous $CO_2$. The $CO_2$ liberated during the reaction may be treated in a washing tower with NaOH-containing solutions in order in this way to reform the soda required for precipitating the $Ca^{++}$.

However, in order, in the case of a dilute soda solution, which on account of the solubility of $Na_2CO_3$ in water at room temperature cannot be adjusted to a concentration of any higher than about 200 to 250 g/l of $Na_2CO_3$, to avoid the presence of a relatively large quantity of water which would interfere with electrolysis in the closed brine circuit, it is best to dilute about 50 % standard commercial-grade sodium hydroxide with brine until an approximately 15 to 20% solution of NaOH in the brine is obtained, followed by cooling to approximately 10°C and separation of the sodium chloride precipitated (which may be redissolved at the salt-dissolving stage), the NaCl/NaOH-solution obtained (about 19 to 24% of $Na_2CO_3$, about 10 to 12% of NaCl) being used for absorbing the $CO_2$. In this case, it is only the water present in the 50% sodium hydroxide solution which is introduced into the brine.

A 10 to 25% by weight $CaCl_2$ solution, which may optionally contain magnesium, is preferably prepared in the manner described. In order to separate off the magnesium, alkali hydroxide, preferably sodium hydroxide, is added to the solution until a pH in the range from about 8 to 10 is obtained. Magnesium is thereby precipitated in the form of magnesium hydroxide and may be separated off by filtration.

The $CaSO_4 . 2 H_2O$ obtained during the precipitation of $SO_4$ may be converted into $CaCO_3$ with about 50% sodium hydroxide in a stoichiometric ratio with addition of $CO_2$ under slightly elevated pressure, preferably about 0.2 to 1 atm gauge, and at temperatures in the range from about 25° to 80°C. The $Na_2SO_4 . 10 H_2O$ formed as secondary product may be washed out with water. The pure calcium carbonate may be added to the calcium carbonate containing magnesium hydroxide, which accumulates during precipitation of the excess calcium, and correspondingly converted into calcium chloride and $CO_2$ or, optionally, may be separately converted directly into calcium chloride and $CO_2$.

One special embodiment of the process according to the invention is described in the drawing which is a flow sheet of the process in which the reference numerals used have the following meaning:

1 — electrolysis cell;
 2 — brine regeneration;
 3 — NaCl addition;
 4 — first component stream;
 5 — second component stream;
 6 — calcium sulfate dihydrate precipitation vessel;
 7 — calcium chloride input;
 8 — settler;
 9 — calcium sulfate dihydrate removal;
10 — combined brines;
11 — calcium carbonate and magnesium hydroxide precipitation;
12 — sodium hydroxide addition;
13 — sodium carbonate addition;
14 — filtration;
15 — brine feed to cell;
16 — calcium carbonate and magnesium hydroxide dissolution;
17 — HCl input;
18 — sodium hydroxide input;
19 — magnesium hydroxide separation;
20 — calcium chloride solution;
21 — calcium sulfate dihydrate dissolution;
22 — $CO_2$ input;
23 — NaOH input;
24 — separation of calcium carbonate and sodium sulfate hydrate;
25 — sodium sulfate hydrate removal;
26 — calcium carbonate dissolution;
27 — hydrochloric acid input;
28 — 50% sodium hydroxide solution;
29 — brine input;
30 — container;
31 — cooler;
32 — sodium chloride separation;
33 — sodium chloride recycling;
34 — absorption; and
35, 36, 37 — $CO_2$-pipe More particularly, the brine leaves the electrolysis cell 1 with a sodium chloride content of approximately 280 g/l and enters the dissolving stage 2, where for example solid sodium chloride is added through conduit 3 to regenerate the brine to 320 g of sodium chloride per liter. The brine is then divided up into the component streams 4 and 5. The component stream 4 is treated in a precipitation vessel 6 with calcium chloride introduced through conduit 7 in order to precipitate calcium sulfate dihydrate which is removed in the settling vessel 8 through conduit 9. The component streams are combined in conduit 10 and $Ca^{++}$ and $Mg^{++}$ are precipitated in vessel 11 through the introduction of sodium hydroxide and sodium carbonate, respectively, through conduits 12 and 13. The soda solution 13 is prepared by mixing brine through conduit 29 with 50% sodium hydroxide 28 in the container 30, the NaCl precipitated is centrifuged off 32 after cooling 31 and the salt precipitated is recycled through conduit 33 to the brine regeneration stage. $CO_2$ is introduced into an absorption stage 34 from vessel 16 via conduits 35 and 36 and the requisite $Na_2CO_3$-solution formed in this way 13. After filtration in 14, the filtered brine may be returned to the electrolysis cell through conduit 15. The deposit containing calcium carbonate and magnesium hydroxide is dissolved in 16 by the addition of hydrochloric acid through 17, after which the pH-value is adjusted to about pH 9.5 through sodium hydroxide introduced through 18, resulting in the precipitation of magnesium hydroxide which may be removed in the filter 19. The resulting calcium chloride may be reused through conduits 20 and 7 for the precipitation of calcium sulfate dihydrate. The calcium sulfate dihydrate removed in settler 8 through conduit 9 is treated under pressure in vessel 21 with $CO_2$ introduced through pipe 35 and input 23 and sodium hydroxide introduced through input 22, resulting in the formation of calcium carbonate and sodium sulfate hydrate. In vessel 24, the soluble sodium sulfate hydrate is separated by washing from the insoluble calcium carbonate which, in vessel 26, is converted into calcium chloride by the addition of hydrochloric acid through input 27 and may be reused through input 7 for the reprecipitation of calcium sulfate dihydrate. $CO_2$ formed in vessel 26 may be introduced through pipe 37 into the absorption stage 34.

By virtue of the process according to the invention, it is possible with advantage to remove the sulfate content of the salt required for electrolysis using an inexpensive by-product, because $CaCl_2$ accumulates as secondary product during recovery of the soda. Since the $Na_2SO_4$ obtained during reaction of the $CaSO_4$ is a product which is in short supply, no unusable secondary products are formed in this process. Since most of the Ca and $CO_3$ are cycled, the only reagents required are hydrochloric acid and sodium hydroxide. Since the Cl content of the hydrochloric acid used is recovered in the form of $Cl_2$ during electrolysis, hydrochloric acid may be profitably used here for degrading excess HCl, in other words purification of the electrolysis brine is essentially carried out with hydrochloric acid and sodium hydroxide only:

Precipitation I: $SO_4^{--} + 2\ CaCl_2 \rightarrow CaCl_2 + CaSO_4 + 2Cl^-$
Precipitation II: $CaCl_2 + Na_2CO_3 \rightarrow CaCO_3 + 2\ NaCl$
Dissolution: $2\ CaCO_3 + 4\ HCl \rightarrow 2\ CaCl_2 + 2\ H_2O + 2\ CO_2$
Working up: $CaSO_4 + 2\ NaOH + H_2O + CO_2 \rightarrow CaCO_3 + Na_2SO_4 + 1\ H_2O$
$Na_2CO_3$ - solution: $CO_2 + 2\ NaOH \rightarrow Na_2CO_3 + 2\ H_2O$ $$SO_4^{--} + 4\ HCl + 4\ NaOH \rightarrow Na_2SO_4 + 2\ NaCl + 4H_2O$$

The process according to the invention is illustrated by the following Examples:

EXAMPLE

1. Sulfate Precipitation

In a technical institution, two electrolysis cells for the electrolysis of alkali metal chlorides by the Amalgam process at a load of 65 kA were supplied with approximately 7 m³/h of saturated brine. The diluted brine after electrolysis was brought up to strength by addition of 260 kg/h of rock salt (approximately 1 % of $SO_4$, approximately 0.2 to 0.3% of Ca). A component stream of about 600 l/h was separated off from the main stream and introduced into the sulfate precipitation stage. The component stream entered a container approximately 3 meters long, 0.3 meter wide and 0.3 meter deep, at its bottom end. 13 l/h of an approximately 32% $CaCl_2$ solution were added at this point. The stream of brine which flowed off at the upper end then had a solids content of 0.1 g/l. The $CaSO_4 \cdot 2\ H_2O$ (4.5 kg/h) precipitated accumulated at the bottom of the container and was periodically discharged. The brine which entered the sulfate precipitation stage, like the circulating brine, had a sulfate content of approximately 8 g/l, while the brine which left the precipitation stage after the settler had a content of about 4 g of $SO_4^{--}$/l, while the Ca-content amounted to between 2 and 2.4 g/l, which corresponds to a solubility product of $CaSO_4$ of about 2.0 to $2.4 \cdot 10^{-3}$(Mole/l)² at 70°C.

2. $CaCO_3$ Precipitation

The main stream and component stream were recombined just in front of the precipitation vessel, 50 l/h of an $Na_2CO_3$ solution, according to (4) hereinbelow, and a little 50% sodium hydroxide running in. The input was adjusted so that, on completion of filtration, the brine contained an excess of about 400 mg of $Na_2CO_3$ and 50 mg of NaOH. The precipitated brine was pumped through a filter (14 m²). The residence time was up to 16 hours. The purified brine was introduced into the cell.

The residue of the filter was introduced into concentrated 30% acid until a pH-value of about 4 was obtained. The suspension was adjusted to pH 8 with sodium hydroxide and then filtered. The Mg remained quantitatively on the filter together with the insoluble fractions (graphite, $Fe(OH)_3$ etc). The solution running off had a concentration of from 28 to 32%, based on $CaCl_2$, and could be reused for dissolution of the sulfate.

3. Working up $CaSO_4$

The $CaSO_4$ residue from the sulfate precipitation stage was made into a paste with NaOH (50% by weight) in a stoichiometric ratio in the form in which it accumulates, i.e. without drying, in a screw apparatus and was reacted with $CO_2$ under a slight excess pressure, the reaction being accompanied by spontaneous heating. The almost solid cake was then leached with hot dilute $Na_2SO_4$ solution, the solution being cycled between a crystallizer and the leaching stage. In the crystallizer, the $Na_2SO_4$ obtained from the $CaSO_4$ crystallized out almost quantitatively in the form of $Na_2SO_4 \cdot 10\ H_2O$ providing the leaching temperature is as high as possible, i.e. above 80°C, and the crystallization temperature as low as possible, i.e. below 32°C and preferably in the range from about 0° to 10°C.

4. Preparation of the Soda Solution

Brine containing 300 g/l of NaCl and 50% sodium hydroxide solution were mixed in a container in a ratio of 1 : 0.4 while cooling to 10°C. After the NaCl precipitated had been separated, the NaOH content amounted to 200 g/l and the residual NaCl content to 153 g/l. This solution was gassed with $CO_2$ in an absorption tower until the $Na_2CO_3$ content amounted to 256 g/l and the NaOH content to 4 g/l, the sodium chloride content remained unchanged. This solution was used for precipitating the $Ca^{++}$ in the brine in step 2.

It will be appreciated that the instant specification and examples are set forth by way of illustration and not limitation, and that various modifications and changes may be made without departing from the spirit and scope of the present invention.

What is claimed is:

1. A process for purifying electrolysis brine comprising dividing the electrolysis brine into first and second streams, adding calcium chloride to the second stream thereby substantially quantitatively to obtain a first precipitate comprising calcium sulfate in the form of $CaSO_4 \cdot 2\ H_2O$ with some magnesium compound admixed therewith, separating off the first precipitate, combining the second stream freed from the first precipitate with the first stream, adding sodium carbonate and alkali hydroxide to the re-combined streams thereby substantially quantitatively to obtain a second precipitate comprising calcium and any magnesium present therein, the calcium being present as $CaCO_3$ in said second precipitate and any magnesium being present as $Mg(OH)_2$, separating off the second precipitate to leave a purified brine, introducing the purified brine into the electrolysis cell, reacting the $CaSO_4 \cdot 2\ H_2O$ first precipitate under pressure with sodium hydroxide and $CO_2$ to form $CaCO_3$ and $Na_2SO_4 \cdot 10\ H_2O$, removing the $Na_2SO_4 \cdot 10\ H_2O$, reacting the $CaCO_3$ with hydrochloric acid to form $CO_2$ and a solution of $CaCl_2$ having some magnesium compound dissolved therein, and recycling the $CaCl_2$ to react with a further quantity of said second stream.

2. A process as claimed in claim 1, wherein the second stream comprises about one-tenth the volume of the starting brine.

3. A process as claimed in claim 1, wherein alkali is added to the $CaCl_2$-containing solution obtained by reaction of the $CaCO_3$ with hydrochloric acid to bring the pH to about 8 to 10, thereby to precipitate as $Mg(OH)_2$ the magnesium contained therein, and separating off the $Mg(OH)_2$ precipitate.

4. A process as claimed in claim 1, wherein to the $CaCO_3$ which is reacted with hydrochloric acid there is added the second precipitate which also contains $CaCO_3$.

5. A process as claimed in claim 1, wherein the purified brine which is introduced into the electrolysis cell has an $SO_4$ ion content of about 4 g/l to 20 g/l.

6. A process as claimed in claim 1, wherein the $CO_2$ formed by reaction of the $CaCO_3$ with hydrochloric acid is absorbed in sodium chloride solution containing sodium hydroxide, which solution is formed by adding about 50% sodium hydroxide to brine and separating off the NaCl precipitated, and the resulting solution containing sodium carbonate is used for precipitating calcium from the re-combined streams.

7. A process as claimed in claim 6, wherein the second stream comprises about one-tenth the volume of the starting brine, the purified brine which is introduced into the electrolysis cell has an $SO_4$ ion content of about 4 g/l to 20 g/l, to the $CaCO_3$ which is reacted with hydrochloric acid there is added the second precipitate which also contains $CaCO_3$, and alkali is added to the $CaCl_2$-containing solution obtained by reaction of the $CaCO_3$ with hydrochloric acid to bring the pH to about 8 to 10, thereby to precipitate as $Mg(OH)_2$ the magnesium contained therein, and separating off the $Mg(OH)_2$ precipitate.

* * * * *